United States Patent [19]
Haven

[11] 3,785,615
[45] Jan. 15, 1974

[54] EMERGENCY TRIP THROTTLE VALVE
[75] Inventor: John B. Haven, Lunenburg, Mass.
[73] Assignee: General Electric Company, Schenectady, N.Y.
[22] Filed: Sept. 1, 1972
[21] Appl. No.: 285,750

[52] U.S. Cl. .................................. 251/74, 74/2
[51] Int. Cl. ...................... G05g 17/00, F16k 31/44
[58] Field of Search ...................... 74/2; 251/74, 73

[56] References Cited
UNITED STATES PATENTS
2,997,052  8/1961  Mangini ............................. 251/74 X
3,030,063  4/1962  Seaberg et al. ....................... 74/2 X Primary Examiner—Allan D. Herrmann
Attorney—James W. Mitchell and John F. Ahern

[57] ABSTRACT

A latching mechanism for an emergency trip throttle valve of the type used to rapidly shut down the flow of steam to a steam turbine. In the reset position with the valve unseated, a latching-up lever supports the valve in an open position against the force of a valve closing spring. In turn, the latching-up lever is supported by a rotatable latch pin. The geometry of the latch pin and latching-up lever causes the valve supporting force to be transferred from the latching-up lever to the latch pin, in a direction acting through the center of rotation of the latch pin. This tends to prevent self-tripping due to vibration and reduces the friction moment required to trip by eliminating all components of the valve supporting force, but that which acts directly through the latch pin center. Additionally, adjustments are provided for insuring the perfect alignment of the latching-up lever and the latch pin.

8 Claims, 3 Drawing Figures

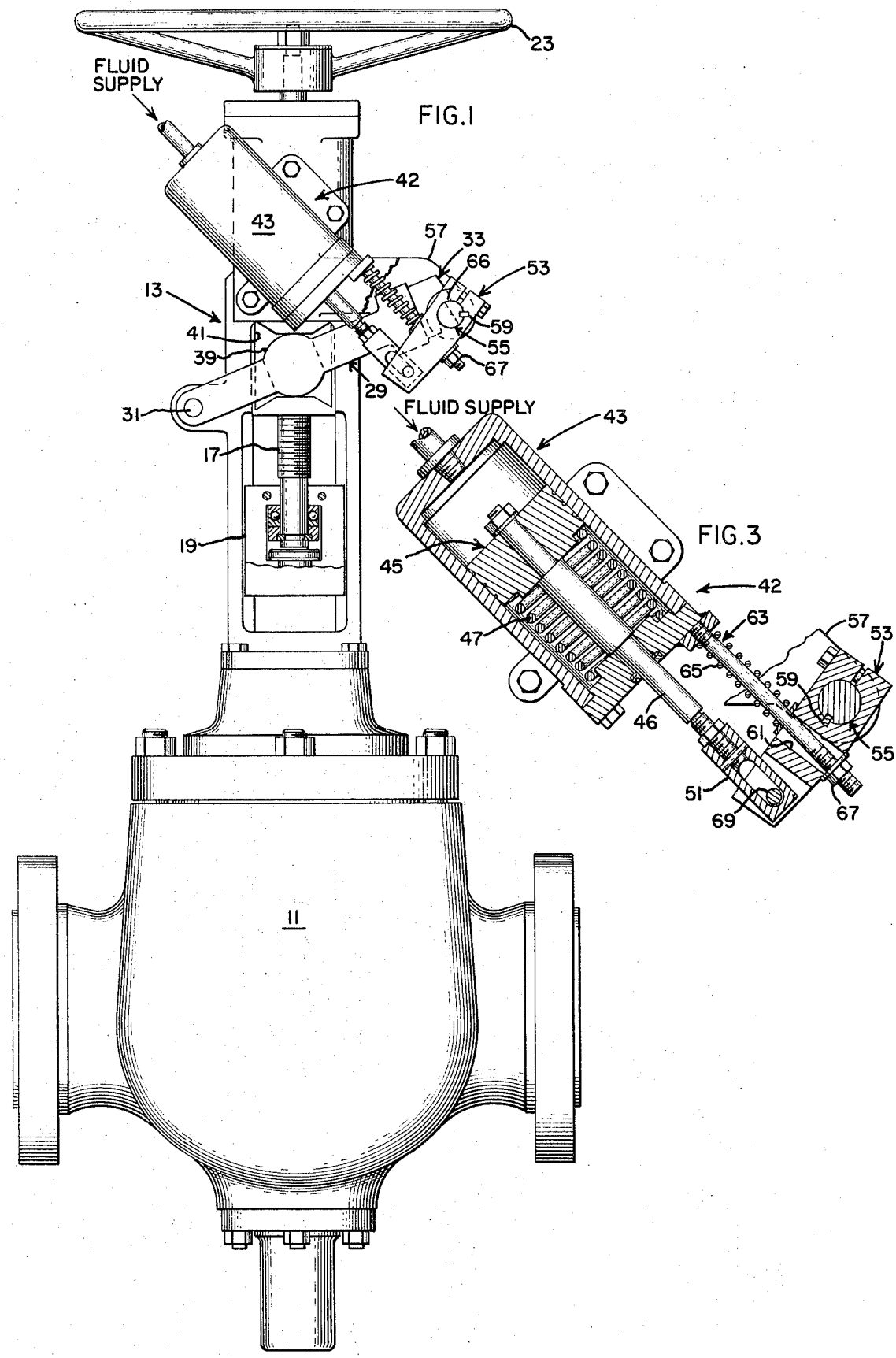

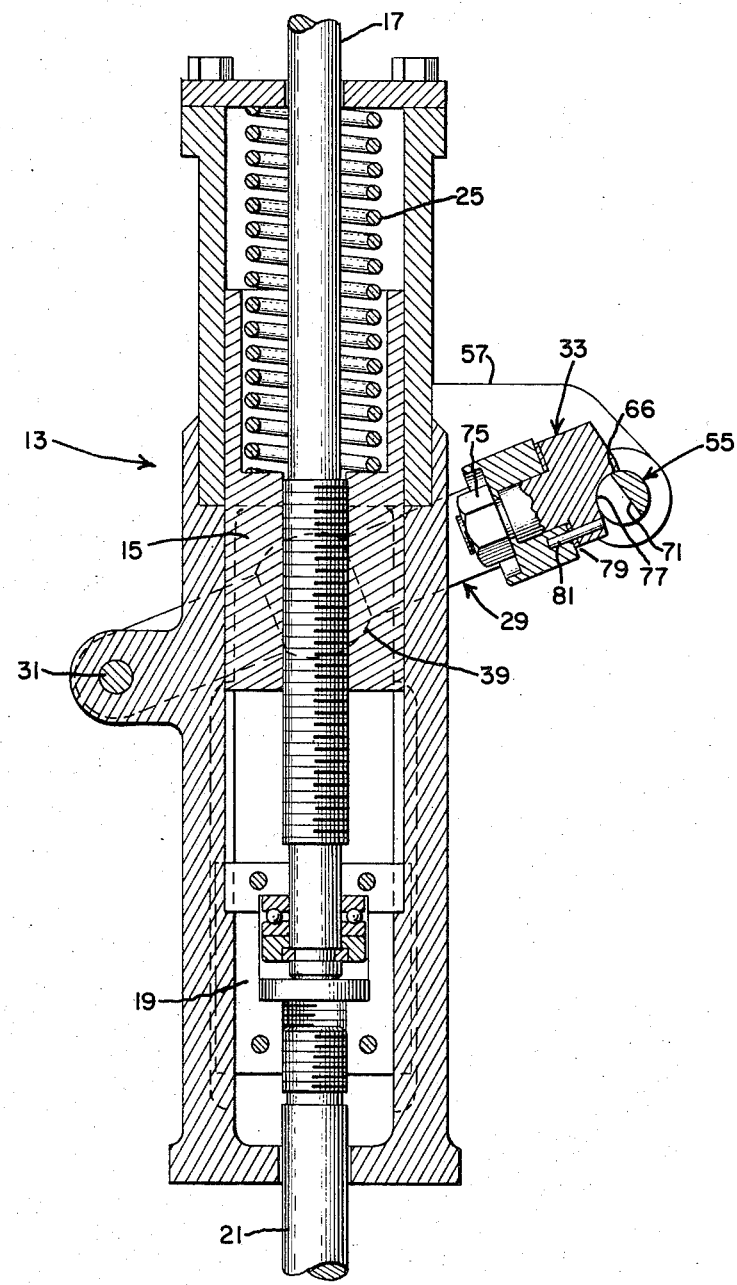

EMERGENCY TRIP THROTTLE VALVE

BACKGROUND OF THE INVENTION

This invention relates, in general, to emergency trip throttle valves of the type used to rapidly shut off a flow of steam to a steam turbine; and, in particular, this invention relates to a latching mechanism used to set the valve in an open position whereupon it may be rapidly shut down under predetermined conditions.

In a prime mover, such as a steam turbine, driving a load member, if a sharp decrease or loss of load occurs, it is essential that the steam supply to the turbine be shut off immediately to prevent possible overspeed. The length of time permitted between a loss of load and the closing of turbine admission valves may be on the order of 0.1 to 0.2 seconds. This unique "fast closing" specification requires that the tripping mechanism for the valve be extremely sensitive for rapid closure but relatively insensitive to vibration in terms of the surrounding environment which may tend to cause inadvertent tripping of the valve.

One example of an emergency trip throttle valve is found in U.S. Pat. No. 2,813,429 to J. B. Stevens, issued Nov. 19, 1957. In that patent, a rotatable valve stem is inserted in a movable carriage which is slidably mounted in a sleeve and latched against the force of a closing spring. A latch arm is pivotally connected to a support link at one end, pivotally connected to the movable carriage at a point intermediate the ends of the latch arm, and has its other end resting on a rotatable, adjustably biased, hook member. The hook member is rotatable under the influence of a tripping lever to release the latch arm to quickly close the valve under preset conditions. Since the valve must be closed very rapidly, frictional forces opposing the rotation of the hook member and the "pull out" force must be minimal. The "pull out" force is minutely adjustable in the cited patent and may be defined as the force necessary to trip the valve while avoiding inadvertent valve trips due to plant vibration. In the Stevens patent, frictional forces are minimized by the use of ball bearings on rotatable latch parts. The tendency to trip inadvertently is countered, in the Stevens patent, by a regulating bolt which applies an adjustable force in a direction opposite the tripping direction.

It is one object of the present invention to provide an improved emergency trip throttle valve.

It is another object of the present invention to provide an improved latch mechanism for an emergency trip throttle valve.

It is another object of the present invention to provide a valve latch mechanism having no self-tripping tendencies.

Another object of the present invention is to provide means for adjusting the alignment of the latch mechanism.

Other objects and advantages will become apparent from the following description of one embodiment of the present invention, and the novel features will be particularly pointed out hereinafter in the claims.

SUMMARY OF THE INVENTION

A rapidly closing, emergency trip throttle valve for a steam turbine includes an improved latch mechanism which has eliminated any tendency toward self-tripping while improving the efficiency of the valve closing or tripping mechanism. This has been accomplished by replacing any force necessary to avert a self-trip (which necessarily opposes the tripping mechanism thus reducing its efficiency) by an adjustable positioning means which increases the stability of the latch mechanism. Further, the substantial friction moment, which has in some designs required the use of ball bearings, has been reduced in the present invention by decreasing the moment arm of the friction force. Specifically, this has been accomplished by mounting the latch component supporting the valve against a closing spring, directly on a rotating latch pin so that the frictional component of the valve supporting force acts through the axis of rotation rather than at a point relatively far removed from the axis of rotation. Further, the latch mechanism includes adjustable latch parts which allow the latch mechanism to be perfectly aligned during assembly.

BRIEF DESCRIPTION OF THE DRAWING

FIG. 1 is a side elevation view of an emergency trip throttle valve, partially cut away, and showing the present invention assembled.

FIG. 2 is an enlarged side elevation view, of a portion of the valve stem and latching-up lever.

FIG. 3 is a side elevation view of the tripping mechanism, according to the present invention, partially sectioned.

DETAILED DESCRIPTION OF THE INVENTION

Referring to FIGS. 1 and 2, an emergency trip throttle valve includes a flow control portion or valve body 11 and a lifting mechanism support 13 bolted to the valve body as shown. A vertically movable lifting nut 15 is constrained within the lifting mechanism support and is threadedly engaged with a rotatable valve lifting rod 17. Also vertically movable and constrained within the valve sleeve is a connector 19 in which the valve lifting rod is rotatable without turning the connector or valve stem 21. The valve lifting rod is rotatable by means of a handwheel 23. Clockwise rotation of the handwheel will raise the lifting nut 15 against the force of valve closure spring 25 until the lifting nut is in the reset position. Thereafter, counterclockwise rotation of the handwheel will raise the valve stem from its seated position.

A latching-up lever 29 is pivotally connected, at one end, to the lifting mechanism support by a pin 31. At the other end of the latching-up lever is a latch block 33. Intermediate the ends of the latching-up lever, there is formed a curvilinear section 39 which is positioned within a cutout 41 formed within the lifting nut 15. The curvilinear section provides a smooth bearing surface for the latching-up lever which must bear against the lifting nut.

Referring now to FIGS. 1 and 3, the tripping mechanism 42 includes a hydraulic cylinder 43 which is fixed to the lifting mechanism support. A piston 45 including piston rod 46 is spring-biased by a trip cylinder spring 47. The spring is in compression, and acts against the fluid pressure introduced into the cylinder as shown. A clevis 51 is threaded onto the free end of the piston rod 46 and follows the movement of the piston.

A latch pin lever 53 is supported by a latch pin 55 which is rotatably supported by a cantilevered flange 57 fixed to the lifting mechanism support. Relative rotation between the latch pin and latch pin lever is prevented by a key 59. Further, the latch pin lever is formed with an opening 61 through which is inserted a rod 63, supported at one end by the hydraulic cylinder and threaded at its free end. A reset bias spring 65 is concentrically mounted, in compression, around the rod 63 so that one end of the spring bears against the hydraulic cylinder and the other end bears against the latch pin lever. A latch engagement limit stop 67 in the form of an adjusting nut is applied to the free end of the rod 63. If the limit stop 67 or nut is tightened it will rotate the latch pin lever and consequently the latch pin in a clockwise direction against the reset bias spring 65. Since it will be later discussed, under the operation of the invention, it may be briefly pointed out that the contact surface 66 between the latch pin and latch block may be varied by means of the limit stop. If the limit stop 67 is loosened, it will allow the reset bias spring to rotate the latch pin lever and latch pin counterclockwise, increasing the contact surface. At the end of the latch pin lever opposite the latch pin there is a pin 69 which is inserted into the clevis 51. While the latch mechanism is being reset, the pin 69 may travel freely in the clevis when the trip cylinder is pressurized with fluid.

The latch pin 55 includes both a circular portion and a semicircular contact surface, the latter defining a flat spot 71. (FIG. 2).

The latch block 33 and its alignment adjustment features will now be described. The latch block is adjustably retained within the latching-up arm by means of a nut 75. The latch block is further formed with a curvilinear latch block face 77 which will ultimately bear against the latch pin when the latching-up lever is in the reset position. It is desirable therefore that the curvilinear latch block face mate perfectly with the semicircular portion of the latch pin to assure smooth operation, later described, of the latching mechanism during reset and trip operations. A shim 79 may be inserted, as shown (FIG. 2), to further this alignment. After correct alignment is secured, the nut 75 may be tightened and a pin 81 inserted to provide a permanent alignment.

The operation of the device is as follows. Hydraulic pressure is established in the trip cylinder 43 causing the clevis 51 to move away from pin 69, allowing the reset bias spring 65 force to rotate the latch pin lever 53 together with the latch pin 55 to the reset position until the latch pin lever contacts the latch engagement limit stop 67. With the valve seated, the handwheel 23 is rotated in the clockwise direction causing the lifting nut 15 to rise on the threaded valve lifting rod 17 against the force of the valve closing spring 25. This causes the latching-up lever 29, which is centrally supported by the lifting nut, to pivot about the pin 31 until the latch block 33 contacts the latch pin 55. With continued motion of the lifting nut, the latch block slides by the latch pin causing it to rotate against the reset bias spring 65 in the tripping direction, with pin 69 moving in the clevis 51 until the latch block is clear of the latch pin, whereupon the latch pin and the latch pin lever return to the reset position due to the force of the reset bias spring. The latching-up lever is now in the reset position. The latching-up lever and the lifting nut are now supported by the latch pin. The latch block face 77 and the latch pin are in intimate contact. The contact area may be adjusted by turning the limit stop nut 67. The present latch mechanism is inherently stable and requires no counter forces (opposing the tripping force) to prevent inadvertent trips due to plant vibrations.

In the reset position, the latch block and latching-up lever are supported by the latch pin, and the lifting nut is supported by the latching-up lever. Rotation of the handwheel in a counterclockwise direction now causes the threaded valve lifting stem to unseat the valve. With the valve open, and a decrease in hydraulic pressure, the piston in the hydraulic cylinder is forced to the bottom of the cylinder by the trip cylinder spring. This causes the latch pin lever and latch pin to rotate thereby allowing the latch block to pass by the flat spot on the latch pin as the valve closing spring forces the lifting nut and latching-up lever to move rapidly downward to close the valve.

While there is shown what is considered to be, at present, the preferred embodiment of the invention, it is, of course, understood that various other modifications may be made therein, and it is intended to cover in the appended claims all such modifications as fall within the true spirit and scope of the invention.

What is claimed is:

1. A latch mechanism for an emergency trip throttle valve of the kind used to rapidly shut down the flow of steam to a steam turbine; said valve including a flow control portion and a lifting mechanism support, the latter constraining a vertically movable valve lifting nut, having a valve lifting rod rotatable therein and operatively connected with the flow control portion; said valve lifting rod biased in the closing direction by a valve closing spring acting on the lifting nut; said latch mechanism including:
    a latching-up lever having one end pivotally supported and the other end free; said latching-up lever alternately supporting and supported by, at a point intermediate said ends, the valve lifting nut, and hence valve lifting rod;
    a rotatable latch pin having a peripheral contact surface for supporting the free end of said latching-up lever when the latch mechanism is in a reset position;
    a latch pin lever, supported by said latch pin and rotatable therewith; and,
    tripping means operatively connected with said latch pin lever.

2. The latch mechanism as recited in claim 1 wherein there is further included positioning means for regulating the contact surface between the latching-up lever and the latch pin in the reset position.

3. The latch mechanism as recited in claim 2 wherein the positioning means includes:
    a reset bias spring urging said latch pin lever and said latch pin in a direction counter to the tripping direction; and
    adjustable stop means constraining said reset bias spring whereby the contact surface may be increased or decreased by loosening or compressing said reset bias spring.

4. The latch mechanism as recited in claim 1 wherein the latch pin is formed in part with a semicircular surface for supporting said latching-up lever whereby rotation of latch pin about its own axis will cause the latching-up lever to be released.

5. The latch mechanism as recited in claim 1 wherein the latching-up lever further includes a latch block adjustably retained in the free end of the latching-up lever.

6. The latch mechanism as recited in claim 1 wherein the tripping means includes a hydraulic cylinder having a piston therein; said piston being spring-biased in the tripping direction and fluid actuated against the force of said spring; and, said piston being connected, at its free end, to the latch pin lever.

7. The latch mechanism as recited in claim 6 wherein the free end of the piston includes a clevis and the latch pin lever is formed with a pin which freely moves in said clevis.

8. A latch mechanism for an emergency trip throttle valve of the kind used to rapidly shut down the flow of steam to a steam turbine; said valve including a flow control portion and a lifting mechanism support, the latter constraining a vertically movable valve lifting nut, having a valve lifting rod rotatable therein and operatively connected with the flow control portion; said valve lifting rod biased in the closing direction by a valve closing spring acting on the valve lifting nut; said latch mechanism including:

a latching-up lever having one end pivotally supported and the other end free; said latching-up lever alternately supporting and supported by, at a point intermediate said ends, the valve lifting nut;

an adjustable latch block retained in the free end of said latching-up lever;

a rotatable latch pin having a peripheral contact surface for supporting said latch block against the valve closing spring when in the reset position, said latch pin having a portion removed to permit release of the latch block when the pin is rotated about its axis to a tripping position;

a latch pin lever supported by said pin and connected to rotate the pin;

a fluid responsive actuator connected to move said latch pin lever through an arc so as to rotate the latch pin from a reset position to a tripping position, said actuator having lost motion means to allow actuation of the latch pin lever by the latch block when the latching-up lever is reset;

adjustable stop means for limiting movement of the latch pin lever toward the reset position; and, spring means biasing the latch pin lever toward said stop means.

* * * * *